United States Patent [19]

Bergdahl

[11] 4,130,404
[45] Dec. 19, 1978

[54] METHOD AND DEVICE FOR CLEANING FLUID FILTERS

[76] Inventor: Knut E. Bergdahl, Kvartsgränd 4, S-85252 Sundsvall, Sweden

[21] Appl. No.: 847,019

[22] Filed: Oct. 31, 1977

[30] Foreign Application Priority Data

Nov. 2, 1976 [SE] Sweden .............................. 7612149

[51] Int. Cl.² .............................................. B01D 23/26
[52] U.S. Cl. ........................................ 55/242; 55/291; 55/404
[58] Field of Search ............ 55/96, 242, 290, 400, 55/404-409, 352, 288, 291; 210/77, 82, 354, 380 R, 391, 402, 416, 407, 409, 412, 393; 209/270, 268

[56] References Cited

U.S. PATENT DOCUMENTS

| | | | |
|---|---|---|---|
| 2,473,501 | 6/1949 | Bahnson | 55/290 |
| 2,633,929 | 4/1953 | Farr | 55/242 |
| 3,262,573 | 7/1966 | Schutte | 210/380 |
| 3,655,058 | 4/1972 | Novak | 210/380 |
| 3,778,982 | 12/1973 | Birke | 55/290 |
| 3,877,905 | 4/1975 | Novak | 55/404 |
| 3,882,025 | 5/1975 | Talley | 210/354 |

Primary Examiner—William A. Cuchlinski, Jr.
Assistant Examiner—Jon E. Hokanson
Attorney, Agent, or Firm—Browdy and Neimark

[57] ABSTRACT

A method and device for cleaning fluid filters of the kind comprising a filter member, which is rotatable to be cleaned by means of centrifugal action, includes a device to reverse the direction of the fluid flow through the filter member during rotation thereof at a high speed. A device may also be provided for rotating the filter member during filtration.

3 Claims, 5 Drawing Figures

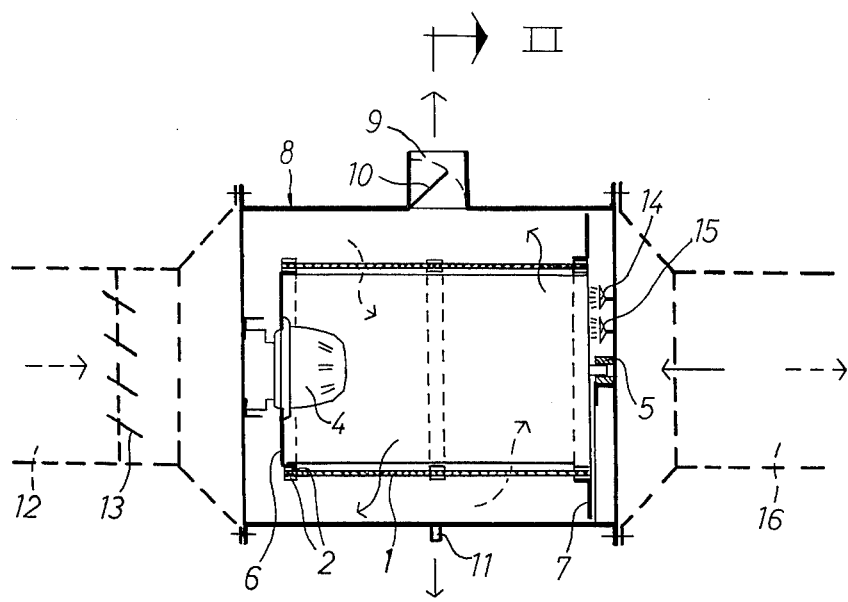
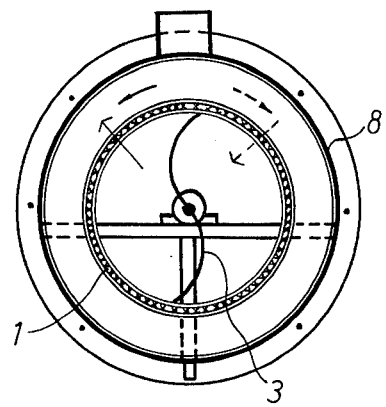
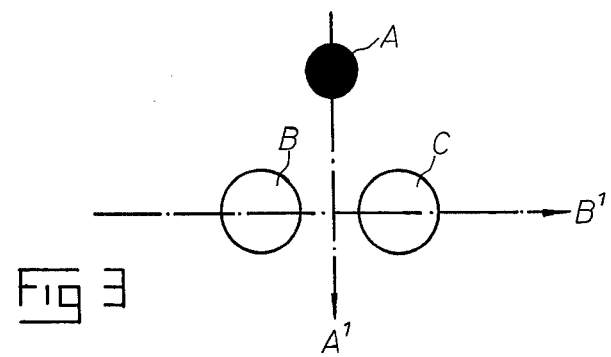

METHOD AND DEVICE FOR CLEANING FLUID FILTERS

The invention relates primarily to a method for cleaning fluid filters, in particular gas filters, of the kind comprising at least one filter member having a casing defining to least one cavity, the fluid flowing through said casing in a direction into the cavity during filtration, said filter member being rotated at a high speed in order to be cleaned by means of centrifugal action. The invention also relates to a device for carrying out this method.

A method of the kind indicated is known by e.g. the German publication for public inspection 2,433,934 and the U.S. Pat. No. 3,262,573. However, this known method has not proved to be capable of providing a satisfactory cleaning of the filters, especially not when the fluid to be filtered contains particles of a very small size. Accordingly the filters have tended to the clogged thereby causing a decreased flow capacity.

The prime object of the invention is to eliminate said draw back and provide a method involving a considerably improved cleaning action.

Another object of the invention is to provide a fluid filtering device, in which a rotatable filter member may be rotated by simple and efficient means.

The prime object of the invention is achieved by means of a method, which is primarily characterized by reversing the direction of flow of the fluid, when cleaning said filter member, in order to cause the fluid to flow through said filter member in a direction away from said cavity. By reversing the direction of fluid flow during rotation of said filter member at a high speed it has proved to be possible to attain a highly increased cleaning action. This is due to the fact that the reversed fluid flow conveys particles collected in the filter member in a direction toward the outermost casing surface of said filter member, from which the particles are removed by a combination of the centrifugal action and the reversed fluid flow. When no reversed fluid flow is provided it has proved that small particles collected in and on the filter have been retained between the fibres or the like constituting the filter member.

Other features of the invention appear from the claims.

Referring to the appended drawings, a closer description of embodiments of the invention will follow hereinafter.

In the drawings:

FIG. 1 is a diagrammatical, partly cut view of the device according to the invention;

FIG. 2 is a cross section taken along line II—II in FIG. 1;

FIG. 3 is a diagrammatical view illustrating the filtering process;

Figure 4:
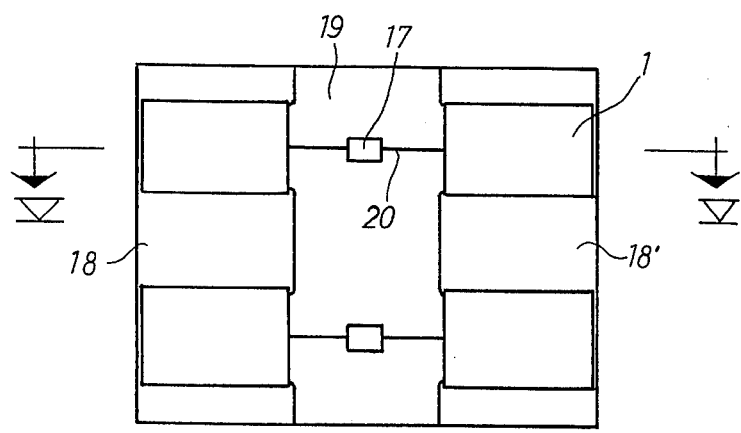
FIG. 4 is a diagrammatical view illustrating a filter assembly comprising a plurality of filter members.

In FIGS. 1 and 2, a filter member is generally denoted by the numeral 1. The filter member is adapted to remove solid and misty impurities from fluids, such as gases and particularly air. The filter member may be of the dry type as well as of the type coated or soaked with adhesives. In the embodiment shown, the filter member 1 is cylindrical and clamped between circular bands 2 surrounding a vane or blade 3, which together with the filter member 1, is rotatably journalled by a drive means 4, preferably in the form of an electrical motor, and a bearing 5. The vane or fan blade is located within the filter member 1 and carries a pin which is supported by bearing 5. Drive means 4, i.e. the stator thereof, and bearing 5 are in turn by suitable means, such as rods or the like, connected to a housing 8, in which the filter member is housed. The housing 8 is preferably cylindrical and connected on one hand to an inlet member 12 and on the other to an outlet member 16. Housing 8 and members 12, 16 form a duct for the air to be filtered.

A fan (not shown) is arranged to provide a negative pressure or vacuum in outlet member 16 and accordingly also in housing 8 and inlet member 12 in order to suck air from inlet member 12 through filter member 1 and into outlet member 16 as illustrated with dashed arrows in FIG. 1. The fan not shown is thus intended to be disposed to the right of housing 8, as viewed in FIG. 1.

Between drive means 4 and filter member 1, there is provided a circular and annular wall 6 to ensure that air, during filtration, flows through the filter member into the cavity present therein. The wall is connected to the rotor of drive means 4 and to filter member 1. To the vane 3 and filter member there is connected a second, circular, annular wall 7 arranged to bridge the space between the filter member 1 and the inside of the wall of housing 8. The walls 6, 7 are arranged at the ends of filter member 1 in the manner appearing from FIG. 1.

In normal flow of air through the duct member 12, housing 8 and duct member 16 in the direction of the dashed arrows by means of the fan not shown, said filter member 1 is caused to rotate by the vane 3 connected thereto, said rotation involving an increased filtering action as will be described hereinafter.

The filter member 1 is rotatable at a high speed by drive means 4 in order to clean the filter member by centrifugal force, particles being loosened from the filter member and thrown outwardly in a radial direction. When filter member 1 is rotated by drive means 4 for cleaning by centrifugal force, the direction of the air flow through the filter member is reversed so that air flows through the filter member from the cavity within the filter member and in a direction outwardly. This reversed flow of air is achieved by vane or fan blade 3. The fan (not shown) in the duct member 16 should of course be stopped during this reversed air flow. The reversed air flow is indicated with the arrows drawn with full lines in FIG. 1. Drive means 4 is arranged to rotate the filter member in an opposite direction of rotation as compared to the direction of rotation of filter member 1 during filtration.

According to a preferred embodiment of the invention, a self-acting jalousie damper 13 is disposed forwardly of the filter member 1 as viewed in the direction of air flow during filtration. Said jalousie damper 13 is arranged to keep the duct member 12 open during the air flow for filtration and to close the duct member 12 during cleaning of the filter member and reversed air flow therethrough. In the flow path of the air between jalousie damper 13 and filter member 1, there is provided a second self-acting damper 10, which is arranged to close an outlet 9 in the wall of housing 8 during air flow for filtration and to keep the outlet 9 open during cleaning of the filter member 1 and accordingly during the reversed air flow.

Within or in the vicinity of the cavity of the filter member 1 there is preferably provided spray means 14 for spraying cleaning fluid onto the inside of filter member 1 during cleaning thereof by centrifugal force and reversed air flow. Spraying of cleaning liquid is primarily in question when the dust collected in or on filter member 1 is of a tacky nature or when the filter member is impregnated or soaked with filter oil or an adhesive. The cleaning liquid is forced to penetrate through the filter member 1 while cleaning the same by means of centrifugal force. When a filter member 1 operating in an oiled state or provided with an adhesive is used, there is preferably in or in the vicinity of the cavity of filter member 1 provided second spray means 15 arranged to spray filter oil or adhesive onto the inside of the filter member after cleaning thereof by means of centrifugal force, reversed air flow and cleaning liquid. A drainage opening 11 for the cleaning liquid sprayed through said spray means 14 is arranged in the housing 8 and denoted by the numeral 11. Spray means 14 and 15 are supported by arbitrary means connected to the housing 8.

In order to further increase the cleaning action by reversed air flow, the vane or blade 3 may be designed to provide a pulsating, reversed air flow.

Referring to FIG. 3 the filtering action of a filter member rotating during filtration is diagrammatically illustrated. In FIG. 3, A designates a particle and B, C filter fibres. Assuming that the distance between the fibres is equal to the particle diameter, the particle may in a given state pass between the fibres in the direction A1 when the fibres are not moving. If, however, the fibres are moving in the direction B1, a collision between the particle A and the filter fibres B, C will occur under the same conditions. An increased collision effect of course also involves an improved filtering effect, particularly in connection with tacky dust or fibres coated with an adhesive. By the fact that the filter member 1 according to the invention is arranged to rotate during filtration, a considerably improved filtering effect is obtained.

The device according to the invention is operated as follows: During normal operation of the device there is a vacuum in the duct member 16, housing 8 and duct member 12 by the influence of the fan not shown. Air is sucked from the duct member 12 through the filter member 1 as shown with dashed arrows. Self-acting damper 10 is closed by the vacuum while self-acting damper 13 is kept open. The filter member 1 is rotated by the influence of the air flow on the vane 3 and drive means 4 is in-operative and free-wheeling. At predetermined time intervals, e.g. twenty four hours, the fan (not shown) in the duct member 16 is stopped in order to enable cleaning of the filter member 1. Then drive means 4 is started and filter member 1 is rotated at a high speed in the opposite direction as compared to the direction during filtration, the vane 3 reversing the flow of air through the filter member as shown with the arrows in FIG. 1 drawn with full lines. Through the influence of the over-pressure generated in housing 8 by vane 3, damper 13 is closed and damper 10 is opened. Dust collected on the filter member 1 is loosened by the rotation of the filter member and the turbulent, reversed air flow and is blown out through the opening 9. It is important that the filter member during cleaning is rotated in an opposite direction as compared to during filtration, since this improves the cleaning action. If the dust is of a tacky nature, or the filter member is impregnated with an oil or adhesive, a solvent may be sprayed onto filter member 1 by spray means 14 during the reversed air flow. Hereby a washing action is obtained.

The solvent is drained through the outlet opening 11. In case the filter member was impregnated by an oil or an adhesive, new oil or adhesive may be sprayed through spray means 15 after washing. Then drive means 4 is put out of operation and the fan (not shown) in duct member 16 is put into operation, whereby damper 13 is opened and damper 10 is closed. The filter member 1 is now again rotated during filtration by means of vane 3.

Figure 5:
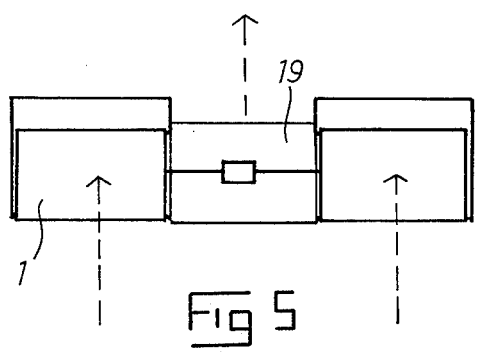
FIG. 5 is a view taken along line V—V in FIG. 4.

In FIGS. 4 and 5 there is diagrammatically shown an embodiment, wherein a plurality of filter members are arranged in one duct system. Two drive means 17 are provided and each of them is connected to two filter members by shaft 20. Air enters into duct members 18, 18' and passes through the filter members and into the outlet duct member 19. The operation of the embodiment according to FIGS. 4 and 5 is for the rest principally the same as the operation of the embodiment according to FIGS. 1 and 2. In the embodiment according to FIGS. 4 and 5 a very high flow capacity is obtained.

The advantages of the invention are evident in that a considerably improved cleaning effect is obtained by the combination of centrifugal force and reversed air flow during rotation of the filter member. By the fact that at least one vane or fan blade is connected to the filter member, an extremely efficient solution is obtained, which enables rotation of the filter member during normal filtration as well as simple reversal of the flow of air through the filter member. Efficient drainage of air carrying particles and dust through the outlet 9 is obtained by the presence of the self-acting dampers 10 and 13.

It should be noted that the feature that said filter member is connected to at least one vane arranged in the flow path of a fluid may be used in any fluid filtering device comprising at least one rotatable filter member and means for directing a fluid through said filter member. In other words, the vane(s) may be used only to rotate the filter member is a flow path for any fluid in order to improve the filtering capacity of said filter member. In this embodiment, the filter member may be cleaned in any arbitrary manner.

According to another embodiment it is, however, possible to rotate the filter member 1 during filtration by drive means 4 and in this case the filter member may lack vanes. The reversal of the air flow is then conducted in any other manner, e.g. by means of a reversible fan disposed in the flow path, and the rotational speed of the filter member may be selected independently of the flow of air and with regard to maximum filtering action. It is obvious that since the filtering effect increases with increasing rotational speed of the filter member in relation to the particle velocity up to a certain limit justified by force involved, by the type of filter and by the kind of particles, the most preferable operational condition may be easily selected for each sitation by corresponding considerations. The filter member may have a plurality of different shapes, e.g. conical or almost disc-like shape, and the term "cavity" should therefore be interpreted in its widest sense. The vane or vanes 3 may be designed in any arbitrary manner and may also be arranged outside the cavity of filter member 1 as long as the vane or vanes are capable of filter member 1 during fluid flow therethrough and also capable of reversing fluid flow through filter member 1 during rotation thereof by drive means 4. Also other modifications are possible within the scope of the appended claims.

What I claim is:

1. A device for filtering particulate matter from a fluid comprising:
   at least one filter member rotatably supported to rotate during filtration and having a casing defining at least one cavity;
   means to direct the fluid to flow through said casing in a generally radially inward direction into the cavity during filtration, said filter member being rigidly connected to at least one vane disposed in the flow path of the fluid; said vane being shaped to effect rotation of said filter member during flow of fluid; and
   drive means connected to the filter member and vane to periodically rotate the filter member and vane at a high speed in a direction of rotation opposite to the direction of rotation of the filter member and vane during filtration in order to clean the filter member from particulate matter deposited thereon by centrifugal action and by reversed fluid flow in a generally radially outward direction through the casing of the filter member, said reversed fluid flow being generated by said vane.

2. A device according to claim 1, wherein the filter member is arranged within a duct for conveying the fluid, a damper is disposed upstream of the filter member as viewed in the direction of flow of the fluid during filtration, said damper being arranged to keep the duct open during fluid flow for filtration and to close the duct during cleaning of the filter by means of the reversed fluid flow through the filter member, and a second damper is disposed in the flow path of said fluid between said first damper and filter member, said second damper being arranged to close an outlet in the wall of the duct during fluid flow for filtration and to keep the outlet open during cleaning of the filter by means of the reversed fluid flow.

3. A device according to claim 1, comprising spray means for spraying cleaning liquid onto the filter member during cleaning thereof, said spray means being disposed within or in the vicinity of the cavity of said filter member, and second spray means for spraying filter oil or adhesive onto the filter member after cleaning thereof, said second spray means also being disposed within or in the vicinity of the cavity of said filter member.

* * * * *